United States Patent [19]

Nishikawa

[11] 4,402,236
[45] Sep. 6, 1983

[54] REGULATING APPARATUS FOR A STEERING WHEEL

[75] Inventor: Masumi Nishikawa, Toyoake, Japan

[73] Assignee: Aisin Seiki Kabushiki Kaisha, Aichi, Japan

[21] Appl. No.: 231,155

[22] Filed: Feb. 3, 1981

[30] Foreign Application Priority Data

Feb. 25, 1980 [JP] Japan .............................. 55-023123

[51] Int. Cl.$^3$ .................... B62D 1/18; G05G 5/22; F16B 2/14
[52] U.S. Cl. .................................... 74/493; 74/531; 403/109; 403/374
[58] Field of Search ............... 74/493, 531; 403/104, 403/109, 370, 374; 280/279

[56] References Cited

U.S. PATENT DOCUMENTS

| | | | |
|---|---|---|---|
| 653,243 | 7/1900 | Hussey | 403/374 |
| 2,331,996 | 10/1943 | Maurer | 74/493 |
| 3,434,368 | 3/1969 | Runkle | 74/493 |
| 3,787,126 | 1/1974 | Arlen | 280/279 X |
| 3,791,223 | 2/1974 | Trekhel | 74/493 |
| 3,874,701 | 4/1975 | Soong | 403/374 X |

Primary Examiner—Allan D. Herrmann
Attorney, Agent, or Firm—Oblon, Fisher, Spivak, McClelland & Maier

[57] ABSTRACT

A regulating apparatus for a steering wheel which includes a case, an outer shaft rotatably inserted in the case, an inner shaft axially slidable within the outer shaft and rotatable for transmitting rotational torque of the steering wheel to a gear box and provided with at least one projection and at least one tapered portion formed thereon, a locking member axially slidable within the outer shaft according to the slidable movement of the inner shaft and provided with at least one projection and at least one tapered portion engageable with the tapered portion of the inner shaft, and a locking rod operatively connected to the inner shaft and the locking member whereby the steering wheel is axially regulated by disengaging the tapered portion of the locking member from the tapered portion of the inner shaft.

4 Claims, 6 Drawing Figures

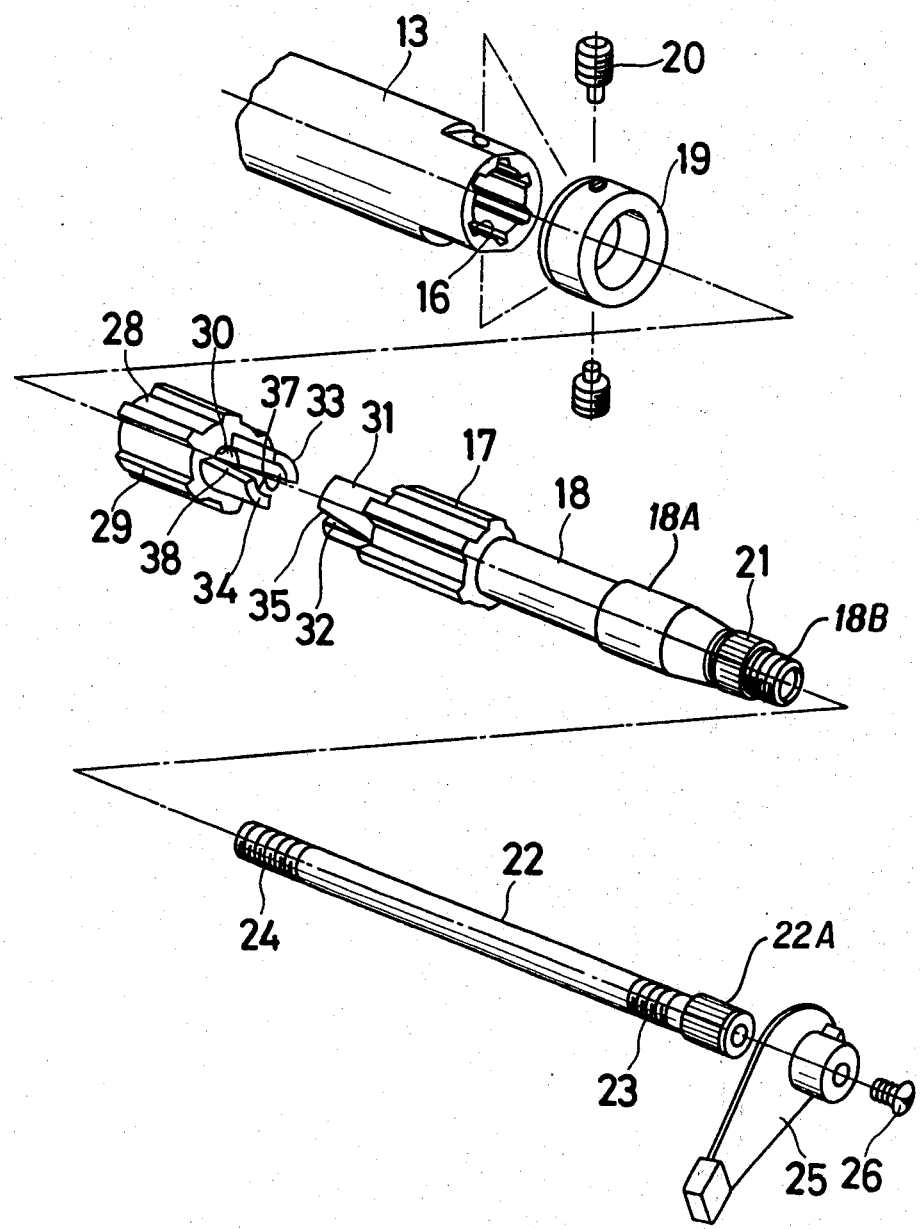

REGULATING APPARATUS FOR A STEERING WHEEL

BACKGROUND OF THE INVENTION

1. Field of the Invention

The present invention relates generally to a steering wheel and more particularly to a regulating apparatus for a steering wheel.

2. Description of the Prior Art

In a conventional regulating apparatus for a steering wheel which can axially regulate the position of the steering wheel, a single wedge member is disposed between an inner and an outer shaft and rotational torque of the steering wheel is transmitted to a side portion of a gear box by the operation of the wedge member. Accordingly, the wedge member is damaged by a load acting on the steering wheel. As a result the rotational torque of the steering wheel cannot be transmitted to the side portion of the gear box.

SUMMARY OF THE INVENTION

An object of the present invention is to provide an improved regulating apparatus for a steering wheel which obviates the aforementioned drawbacks of the described conventional regulating apparatus for a steering wheel.

A further object of the present invention is to provide an improved regulating apparatus for a steering wheel which can reliably transmit rotational torque of the steering wheel to a side portion of a gear box even if the locking state of the regulating apparatus is accidentally disengaged.

A still further object of this invention is to provide an improved regulating apparatus for a steering wheel which is relatively simple and includes a minimum number of parts.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 2 is a disassembled view which shows a regulating apparatus into FIG. 1; and FIGS. 3A and 3C show side elevational views of portions of the elements in FIG. 2 while

DETAILED DESCRIPTION OF THE PREFERRED EMBODIMENT

Figure 1:
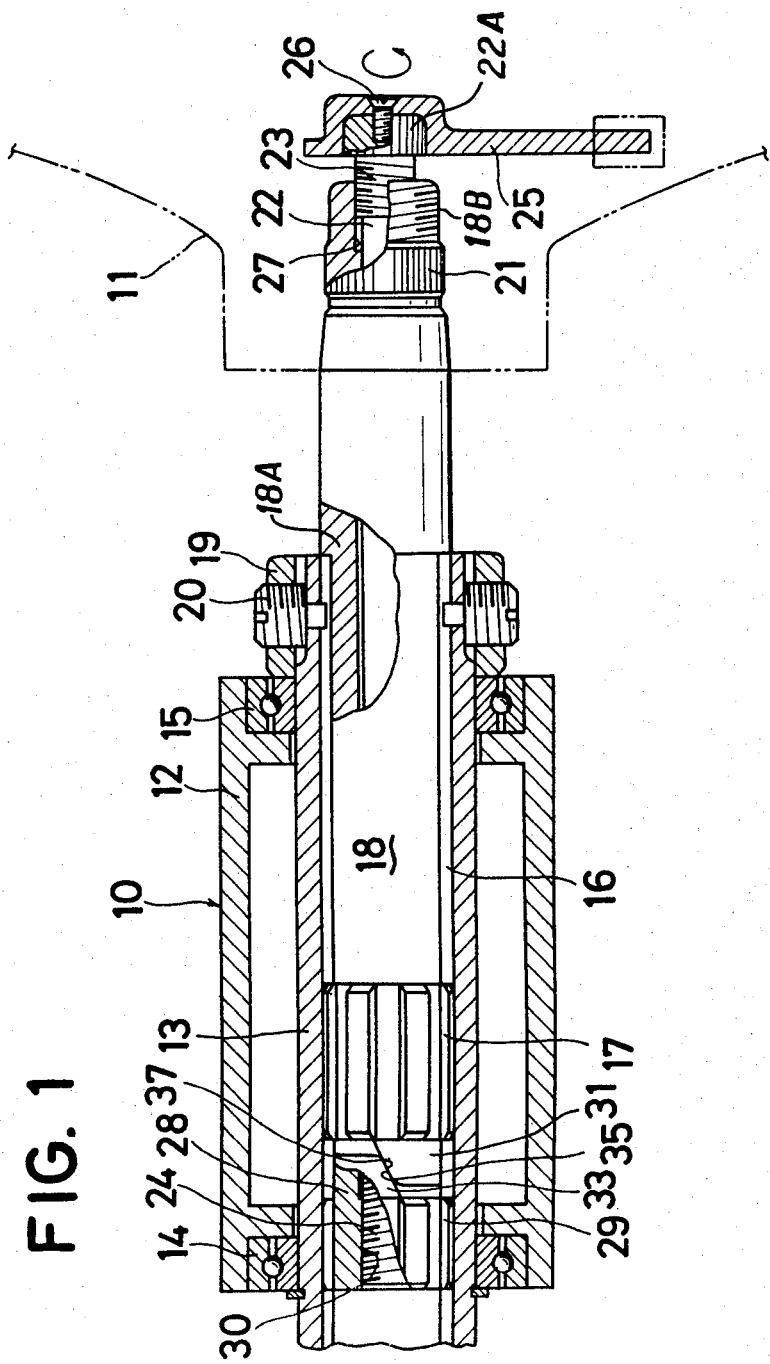
FIG. 1 is a sectional side view which shows a preferred embodiment of a regulating apparatus of a steering wheel according to the present invention.
Figure 3A:
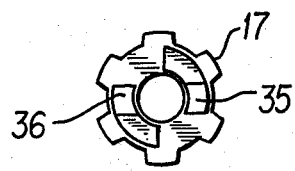
Figure 3B:
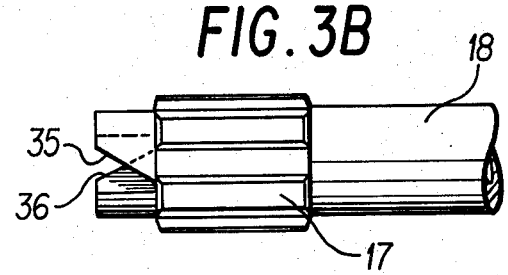
FIGS. 3B and 3D show axial views of the elements shown in FIGS. 3A and 3C, respectively.
Figure 3C:
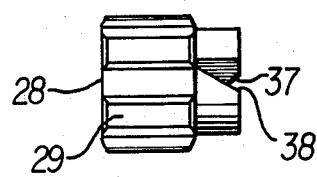
Figure 3D:
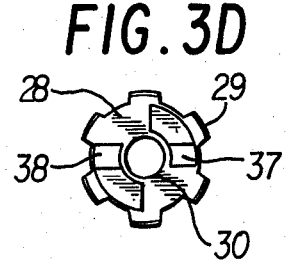

Referring now to FIGS. 1–3D, reference numeral 10 denotes a regulating apparatus for a steering wheel which can axially regulate a steering wheel 11, wherein a case 12 is fixed to a vehicle body (not shown). An outer shaft 13 is inserted into case 12 and is rotatably supported by first and second bearings 14, 15 attached to each end portion of case 12. An inner spline 16 is formed on an inner circumferential surface of outer shaft 13 and an outer spline 17 is formed on an outer circumferential surface of an inner shaft 18 having an enlarged portion 18A and a threaded end portion 18B. These inner and outer splines 16, 17 are engaged with each other. Therefore, inner shaft 18 is axially slidable within outer shaft 13 except for enlarged portion 18A and can transmit torque to a side portion of a gear box (not shown) according to the rotation of steering wheel 11.

Reference numeral 19 denotes a stopper member engageable with enlarged portion 18A and wherein a stopper pin 20 is screwed thereinto. One end of stopper pin 20 is radially and inwardly projected into outer shaft 13 for preventing inner shaft 18 from possible omission.

Steering wheel 11 is fixed to inner shaft 18 by a serration member 21 provided on a right end portion of inner shaft 18 in FIG. 1. Reference numeral 22 denotes a locking rod inserted within inner shaft 12. On a right end portion of locking rod 22 a counterclockwise screw 23 is formed and on a left end thereof a clockwise screw 24 is formed. A lever 25 is fixedly attached to an extreme right end portion 22A of locking rod 22 by means of a pin or screw 26 and locking rod 22 is rotatable in accordance with the rotation of lever 25.

A screw portion 27 is formed on an inner circumference of inner shaft 18 and is screwed with counterclockwise screw 23 of locking rod 22. Thus, counterclockwise screw 23 of locking rod 22 is axially movable to screw portion 27 of inner shaft 17 according to rotation of lever 25. Reference numeral 28 indicates a locking member and is provided with an outer spline 29 on an outer circumferential surface thereof. Outer spline 29 of locking member 28 is engaged with inner spline 16 of outer shaft 13 and a screw portion 30 formed on an inner circumferential surface of locking member 28 is screwed with clockwise screw 24 of locking rod 22. Accordingly, clockwise screw 24 of locking rod 22 is axially movable to screw portion 30 of locking member 28 following counterclockwise screw 23 according to the rotation of lever 25.

Two axial projections 31, 32 having a predetermined clearance between each other are integrally mounted on a left end portion of inner shaft 18. Two axial projections 33, 34 also having a predetermined clearance between each other are integrally mounted on a right end portion of locking member 18. Axial projections 31, 32 of inner shaft 18 are provided with tapered portions 35, 36 and are able to be inserted into the clearance between axial projections 33, 34 of locking member 28. Axial projections 33, 34 of locking member 28 are provided with tapered portions 37, 38 and are able to be inserted into the clearance between axial projections 31, 32 of inner shaft 18. Tapered portions 35, 36 of axial projections 31, 32 of inner shaft 17 are engaged with tapered portions 37, 38 of axial projections 33, 34 of locking member 28 in FIG. 1 which shows the locking state of the regulating apparatus of steering wheel 10.

The operation according to the invention is as follows:

In the situation where steering wheel 11 is rotated, inner shaft 18 is rotated in the same direction with steering wheel 11. Therefore, outer shaft 13 is also rotated in the same direction by outer spline 17 of inner shaft 18 and the rotational torque of steering wheel 11 is transmitted to a shaft of a side portion of the gear box (not shown) by a connecting mechanism such as a joint member, etc.

In case lever 25 is rotated in the arrow direction in FIG. 1 in order to axially regulate steering wheel 11 from the locking state in FIG. 1, locking rod 22 is moved leftwardly by counterclockwise screw 23 and clockwise screw 24 of the locking rod 22 is moved leftwardly. Accordingly, tapered portions 37, 38 of locking member 28 are disengaged from tapered portions 35, 36 of inner shaft 18 thereby axially regulating steering wheel 11 and obtaining the desired position thereof. Namely, since tapered portions 35, 36 of inner shaft 18 are disengaged from tapered portions 37, 38 of locking member 28, inner shaft 18 becomes axially slidable within outer shaft 13.

In the situation where lever 25 is rotated in the opposite direction to the arrow in FIG. 1, locking rod 22 is moved rightwardly and counterclockwise screw 23 and clockwise screw 24 of locking rod 22 is also moved rightwardly. Therefore, tapered portions 37, 38 of locking member 28 are engaged with tapered portions 35, 36 of inner shaft 18 and the locking state shown in FIG. 1 is obtained.

In this locking state of FIG. 1 outer spline 29 of locking member 28 is engaged with one side of inner spline 16 of outer shaft 13 and outer spline 17 of inner shaft 18 is engaged with the other side of inner spline 16 of outer shaft 13 by engaging tapered portions 35, 36 of inner shaft 18 with tapered portions 37, 38 of locking member 28.

By the foregoing discussion, there has been disclosed a preferred form of regulating apparatus for a steering wheel for vehicles constructed in accordance with the present invention. It will be appreciated that various additions, substitutions, modifications and omissions may be made thereto without departing from the spirit of the invention.

What is claimed as new and desired to be secured by Letters Patent of the United States is:

1. A regulating apparatus for a steering wheel of a vehicle body comprising:
    a case fixed to said vehicle body,
    an outer shaft rotatably mounted on said case and having an inner spline member formed in the inner circumference thereof,
    an inner shaft axially slidably mounted within said outer shaft and rotatable for transmitting rotational torque generated by rotation of said steering wheel and further comprising a first and second separately spaced projection with a first and second tapered portion respectively formed thereon and an outer spline member formed on an outer circumferential surface thereof,
    a locking member axially slidably mounted within said outer shaft according to sliding movement of said inner shaft and further comprising a third and fourth separately spaced projection with a third and fourth tapered portion respectively formed thereon and engageable with said first and second tapered portion of said inner shaft for locking sliding movement of said inner and outer shafts and an outer spline member formed on an outer circumferential surface of said locking member, and
    a locking rod operatively connected to said inner shaft and said locking member for engaging or disengaging said inner shaft and said locking member via said first, second, third and fourth tapered portions.

2. A regulating apparatus for a steering wheel as set forth in claim 1 wherein said outer and inner shafts are engaged with each other by means of a splined or serrated connection of said inner spline member and said outer spline member mounted on said inner shaft.

3. A regulating apparatus for a steering wheel as set forth in claim 1 wherein said outer shaft and said locking member are engaged with each other by means of a splined or serrated connection of said inner spline member and said outer spline member mounted on said locking member.

4. A regulating apparatus for a steering wheel of a vehicle body comprising:
    a case fixed to said vehicle body,
    an outer shaft rotatably mounted in said case,
    an inner shaft axially slidably mounted within said outer shaft and rotatable for transmitting rotational torque generated by rotation of said steering wheel and further comprising a projection and tapered portion formed thereon,
    a locking member axially slidably mounted within said outer shaft according to sliding movement of said inner shaft and further comprising a projection and a tapered portion engageable with said tapered portion of said inner shaft for locking sliding movement of said inner and outer shaft, and
    a locking rod operatively connected to said inner shaft and said locking member for engaging or disengaging said inner shaft and said locking member, wherein said locking rod further comprises a counterclockwise screw at one end thereof for screwing engagement with said inner shaft and a clockwise screw at the other end thereof for screwing engagement with said locking member.

* * * * *

UNITED STATES PATENT AND TRADEMARK OFFICE
CERTIFICATE OF CORRECTION

PATENT NO. : 4,402,236

DATED : September 6, 1983

INVENTOR(S) : NISHIKAWA, MASUMI; TOYOAKE, JAPAN

It is certified that error appears in the above-identified patent and that said Letters Patent is hereby corrected as shown below:

In column 3, line 40, delete "on" and insert therefor --in--;

Signed and Sealed this

Third Day of April 1984

[SEAL]

*Attest:*

GERALD J. MOSSINGHOFF

*Attesting Officer*     *Commissioner of Patents and Trademarks*